(12) United States Patent
Dai et al.

(10) Patent No.: US 9,727,684 B2
(45) Date of Patent: Aug. 8, 2017

(54) METHOD AND APPARATUS FOR PHYSICAL-AWARE HOLD VIOLATION FIXING

(71) Applicant: INTERNATIONAL BUSINESS MACHINES CORPORATION, Armonk, NY (US)

(72) Inventors: Hongwei Dai, Shanghai (CN); Jifeng Li, Beijing (CN); Jia Niu, Shanghai (CN); Yu Yun Song, Shanghai (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 261 days.

(21) Appl. No.: 14/633,477

(22) Filed: Feb. 27, 2015

(65) Prior Publication Data

US 2015/0248520 A1    Sep. 3, 2015

(30) Foreign Application Priority Data

Feb. 28, 2014    (CN) .......................... 2014 1 0072528

(51) Int. Cl.
*G06F 17/50*    (2006.01)

(52) U.S. Cl.
CPC ...... *G06F 17/5081* (2013.01); *G06F 17/5072* (2013.01); *G06F 17/504* (2013.01); *G06F 17/5031* (2013.01); *G06F 17/5068* (2013.01); *G06F 2217/84* (2013.01)

(58) Field of Classification Search
None
See application file for complete search history.

(56) References Cited

U.S. PATENT DOCUMENTS

| | | | | |
|---|---|---|---|---|
| 5,896,299 | A | * 4/1999 | Ginetti | ................. G06F 17/505 713/503 |
| 6,546,531 | B1 | * 4/2003 | Quach | ................. G06F 17/5045 716/114 |
| 6,990,646 | B2 | 1/2006 | Yoshikawa | |

(Continued)

OTHER PUBLICATIONS

L. Brusamarello et al., "Statistical analysis of hold time violations," J. of Computational Electronics, Oct. 16, 2010, vol. 9, pp. 114-121.*

(Continued)

*Primary Examiner* — Leigh Garbowski
(74) *Attorney, Agent, or Firm* — David Cain; Andrew M. Calderon; Roberts Mlotkowski Safran Cole & Calderon, P.C.

(57) ABSTRACT

The present invention discloses a method for fixing hold time violations in circuits. The method comprises: creating a topology diagram of the circuit with a branch indicating a signal path where the hold time violation occurs in the circuit, and a node on the branch indicating a port of an element where the hold time violation occurs; dividing the circuit into a plurality of regions; and placing a hold time correction element selectively in a region corresponding to the node in the topology diagram to fix the hold time violation thereof, according to a circuit element density of the region corresponding to the node in the topology diagram. With this method there will be no new element in a region whose circuit element density is excessively large, and it is unnecessary to move an element which has been placed in the circuit and an input/output pin thereof.

10 Claims, 3 Drawing Sheets

(56) References Cited

U.S. PATENT DOCUMENTS

| | | | |
|---|---|---|---|
| 7,137,081 B2 | 11/2006 | Alpert | |
| 7,191,416 B2 * | 3/2007 | Hulbert | G06F 17/5068 716/114 |
| 7,278,126 B2 | 10/2007 | Sun | |
| 7,454,730 B1 * | 11/2008 | Chowdhury | G06F 17/5045 716/114 |
| 7,590,957 B2 | 9/2009 | Walian et al. | |
| 7,620,920 B2 * | 11/2009 | Wang | H03K 5/135 716/113 |
| 7,996,812 B2 * | 8/2011 | Kotecha | G06F 17/5031 716/106 |
| 8,312,403 B2 * | 11/2012 | Irie | G06F 17/505 716/104 |
| 8,316,334 B2 * | 11/2012 | Nagaraj | G06F 17/5031 716/113 |
| 8,316,340 B2 | 11/2012 | Chen | |
| 8,332,793 B2 * | 12/2012 | Bose | G06F 17/5068 716/108 |
| 8,347,250 B2 | 1/2013 | Gonzalez et al. | |
| 8,473,887 B2 | 6/2013 | Xiao | |
| 8,543,964 B2 * | 9/2013 | Ge | G06F 17/5031 716/113 |
| 9,171,112 B2 * | 10/2015 | Kalpat | G06F 17/5031 |
| 2011/0191733 A1 | 8/2011 | Nagaraj et al. | |

OTHER PUBLICATIONS

S. Chowdhury et al., "Repeater Insertion for Concurrent Setup and Hold Time Violations with Power-Delay Trade-Off," ISPD'07, 2007 ACM, pp. 59-66.*

N. V. Shenoy et al., "Minimum Padding to Satisfy Short Path Constraints," 1993 IEEE, pp. 156-161.*

C.J. Alpert et al., "Porosity-Aware Buffered Steiner Tree Construction," IEEE Trans. on CAD of ICs and Systems, vol. 23, No. 4, Apr. 2004, pp. 517-526.*

* cited by examiner

METHOD AND APPARATUS FOR PHYSICAL-AWARE HOLD VIOLATION FIXING

BACKGROUND

The present invention relates to a circuit design field, and more particularly, to a method and an apparatus for fixing a hold time violation in a circuit.

When a circuit (e.g., an integrated circuit, etc.) is designed, after completion of placement and wiring of various elements (e.g., various gate circuits and various standard units) of the circuit, a timing analysis is performed on the circuit to check whether there is a timing violation in the circuit. The timing violation includes a setup time violation, a hold time violation, etc. Setup time indicates time during which data at an input port of a gate circuit should remain stable before a clock edge arrives at the gate circuit. If the time during which the data at the input port of the gate circuit remains stable is less than the required setup time, then the setup time violation occurs, which will render that the data can not be input into the gate circuit correctly when the clock edge arrives at the gate circuit. As known in the art, it may be judged whether the setup time violation occurs through a setup slack. Specifically, when the setup slack is less than 0, it can be determined that the setup time violation occurs. Hold time indicates time during which the data at the input port of the gate circuit should remain stable after the clock edge arrives at the gate circuit. If the time during which the data at the input port of the gate circuit remains stable after the clock edge arrives at the gate circuit is less than the required hold time, then the hold time violation occurs, which will also render that the data cannot be input into the gate circuit correctly. As known in the art, it can be judged whether the hold time violation occurs through a hold slack. Specifically, when the hold slack is less than 0, it can be determined that the hold time violation occurs. When any of the above timing violations occurs, it is necessary to fix the timing violation in order to enable the circuit to work normally.

Usually, the hold time violation is fixed at a final stage of circuit design, namely, after all elements and input/output pins thereof have been placed and fixed and the setup time violation and other timing violations have been fixed. In a conventional method for fixing the hold time violation, an element where the hold time violation occurs in the circuit is found and a delay element is inserted at the element, so as to fix the hold time violation. However, there are several problems in the conventional method for fixing the hold time violation. Firstly, as a scale and complexity of the circuit increase, the circuit comprises a large number of elements, causing high element densities in some regions in the circuit; moreover, in such regions, influence of element characteristic variations caused by manufacturing processes is relatively large, so a lot of hold time violations may occur. If delay elements are inserted in these regions in order to fix the hold time violations, the element densities in these regions will be further increased, and congestion will be caused in wiring of circuit elements. In addition, it is often necessary to move elements which have been placed and/or input/output pins thereof in the conventional method for fixing the hold time violation, which is apt to cause a new timing violation.

SUMMARY

To solve the above issues, an object of the present invention is to provide a method and an apparatus for fixing a hold time violation in a circuit, which can fix the hold time violation in the circuit, and meanwhile avoid a new timing violation from occurring and avoid excessive congestion of the circuit due to the fixing of the hold time violation.

According to an aspect of the present invention, there is provided a method for fixing a hold time violation in a circuit, comprising: creating a topology diagram of the circuit, a branch in the topology indicating a signal path where the hold time violation occurs in the circuit, and a node on the branch indicating a port of a element where the hold time violation occurs in the signal path; dividing the circuit into a plurality of regions; placing a hold time correction element selectively in a region corresponding to the node in the topology diagram to fix the hold time violation, according to a circuit element density of the region corresponding to the node.

According to another aspect of the present invention, there is provided an apparatus for fixing a hold time violation in a circuit, comprising: a topology diagram creating device, configured to create a topology diagram of the circuit, a branch in the topology indicating a signal path where the hold time violation occurs in the circuit, and a node on the branch indicating a port of an element where the hold time violation occurs in the signal path; a circuit dividing device, configured to divide the circuit into a plurality of regions; and a violation fixing device, configured to place a hold time correction element selectively in a region corresponding to the node in the topology diagram to fix the hold time violation, according to a circuit element density of the region corresponding to the node.

In the method and the apparatus of the above aspects of the present invention, it can be determined, according to the circuit element density of the region where the element in which the hold time violation occurs is located in the circuit, whether the hold time correction element (e.g., a delay element) is inserted at the element to fix the hold time violation. In this way, a new element can be prevented from being inserted in the region where the element density is too large, and congestion of wiring can be prevented. Moreover, in the method and the apparatus according to the above aspects of the present invention, it is unnecessary to move an element which has been placed in the circuit and input/output pins thereof, so that a new timing violation due to moving the element/pins can be avoided from occurring.

BRIEF DESCRIPTION OF THE SEVERAL VIEWS OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
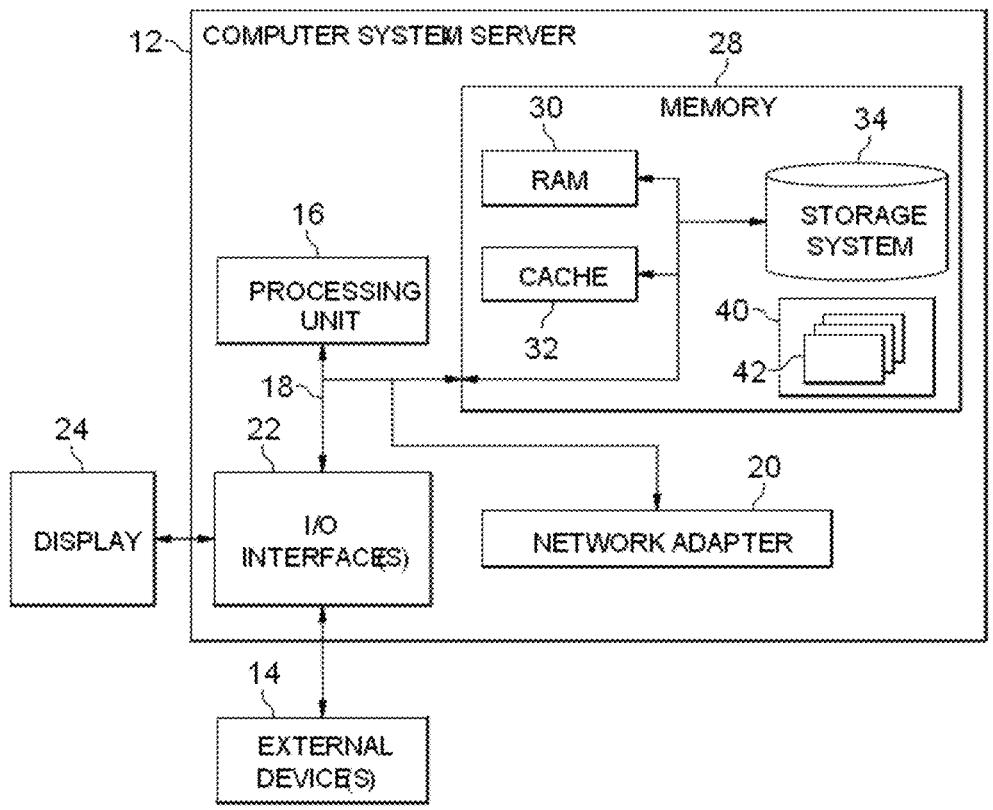
FIG. 1 shows a block diagram of an exemplary computer system/server 12 which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It is to be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, a method and an apparatus for fixing a hold time violation in a circuit according to embodiments of the present invention will be described with reference to the drawings.

Firstly, the method for fixing a hold time violation in a circuit according to an embodiment of the present invention will be described with reference to FIG. 2.

Figure 2:
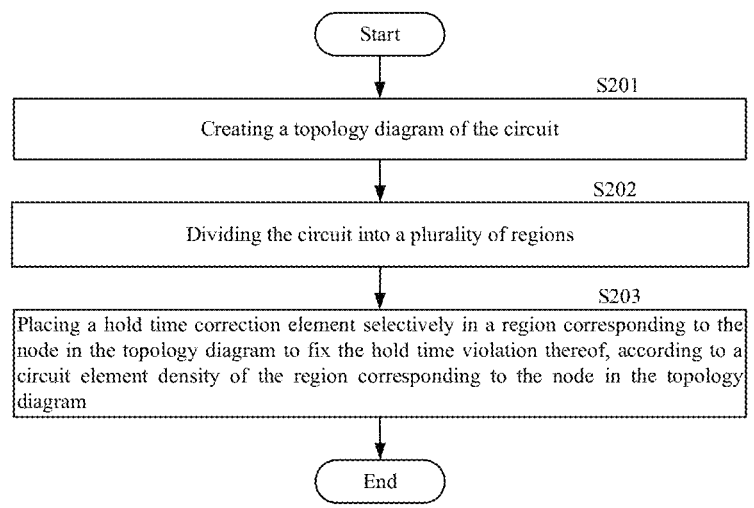
FIG. 2 is a flow chart of a method for fixing a hold time violation in a circuit according to an embodiment of the present invention.

As shown in FIG. 2, in step S201, a topology diagram of the circuit is created, a branch in the topology diagram indicates a signal path where the hold time violation occurs in the circuit, and a node on the branch indicates a port (e.g., an input port or an output port) of an element where the hold time violation occurs on the signal path.

Usually, a designer designs a circuit (e.g., an integrated circuit) by using various elements. The elements may include various sequential units (e.g., intellectual property (IP) cores, registers, etc.) and various combinatorial units (e.g., an AND gate, a NAND gate, etc.). One or more signal paths may be formed between the sequential units. For example, when an output port (which can be used interchangeably with an output pin in the present specification) of a sequential unit is connected to an input port (which can be used interchangeably with an input pin in the present specification) of another sequential unit directly or via one or more combinatorial units, a signal path is formed between the two sequential units. When the circuit operates, a signal flows from an output port of a sequential circuit to an input port of another sequential circuit along the signal path, thereby realizing a designed function. When the circuit is analyzed, all signal paths and all elements on these signal paths in the circuit can be found according to a topology of the circuit.

Further, as described above, at a later stage of circuit design, hold slacks at input ports and output ports of respective elements on each signal path in the circuit can be calculated for the each signal path, so as to determine whether a hold time violation occurs in the signal path according to the hold slacks. The occurrence of the hold time violation on the signal path means occurrence of the hold time violation at all the elements (i.e., at the input ports and the output ports thereof) on the signal path. Thereby, all signal paths where hold time violations occur and all elements (i.e., elements where the hold time violations occur) on the signal paths in the circuit can be found. It is to be noted that when a plurality of signal paths where the hold time violations occur pass through one input port or output port, and there are a plurality of different values of the hold slack at the port calculated for the plurality of paths, a value having a maximum absolute value (which corresponds to a worst hold time violation) therein may be used as the hold slack at the port.

Figure 3:
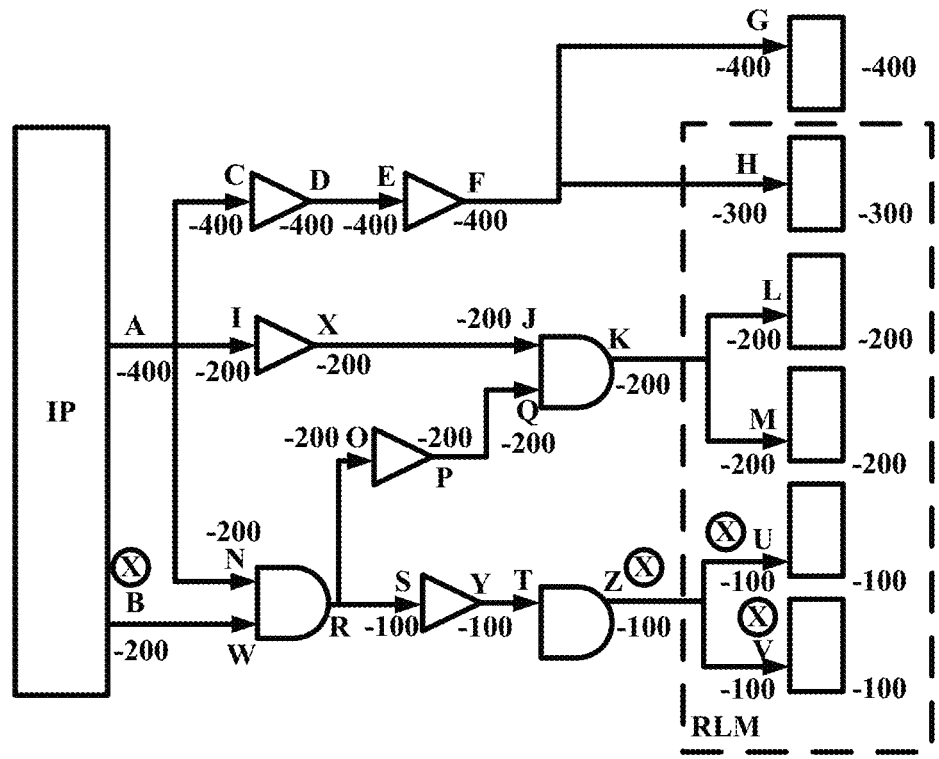
FIG. 3 exemplarily shows a directed acyclic graph (DAG) of a circuit according to an embodiment of the present invention.

Then, the topology diagram of the circuit may be created, according to the respective signal paths where the hold time violations occur in the circuit and the elements where the hold time violations occur on these signal paths. In the embodiment of the present invention, the topology diagram may be a directed acyclic graph (DAG), and hereinafter, the DAG will be taken as an example for description. A branch in the DAG indicates a signal path where the hold time violation occurs in the circuit, and a node on the branch indicates an input port or an output port of an element where the hold time violation occurs. The method for creating the DAG of the circuit is commonly known in the art, and thus a detailed description thereof is omitted here. FIG. 3 exemplarily shows a DAG of the circuit according to an embodiment of the present invention. In the example, the circuit includes sequential circuits (an IP core and registers) and combinatorial circuits (NOT gates and AND gates), where output ports of the IP core are connected with input ports of the respective registers via different combinatorial circuits, respectively, thereby forming a plurality of signal paths, and on these signal paths (at respective elements thereof), hold time violations occur. In FIG. 3, for convenience of description, respective nodes in the DAG are named A, B, C, . . . , X, Y and Z, and a number labeled beside each node indicates a hold slack (e.g., in a unit of millisecond) at the node. As described above, a negative hold slack indicates that a hold time violation occurs at the port corresponding to the node. It is to be appreciated that the topology diagram is not limited to the DAG, and other forms of topology diagrams may be used in other embodiments. In addition, in other embodiments, besides the signal paths where the hold time violations occur and the elements thereof, the created topology diagram may further include a signal path where no hold time violation occurs in the circuit and an element thereof.

It is to be noted that when a hold time violation occurs at an input port or an output port of an element in the circuit, the hold time violation at the input port or the output port may not be allowed to be fixed for some reason. For example, if a fixing operation on the hold time violation at the input port or the output port may result in a new hold time violation (especially, a setup time violation) in the circuit, it is not allowed to fix the hold time violation at the input port or the output port. In the embodiment of the present invention, for each node in the DAG (which corresponds to the input port or the output port of the element where the hold time violation occurs), it may be determined whether it is allowed to fix the hold time violation at the node according to a setup slack (which is usually a positive value) and a hold slack (which is a negative value) at the node. For example, a parameter SetupSlack+$V_1$*HoldSlack may be set, where SetupSlack is the setup slack at the node, $V_1$ is an empirical value (e.g., 3), HoldSlack is the hold slack at the node, and the setup slack and the hold slack may be obtained by a method commonly known in the art. When the parameter is less than 0, this means that the setup slack at the node is not large enough, and in this case, if the hold time violation is fixed at the node, a new setup time violation may be caused, thus the hold time violation should not be fixed at the node. On the contrary, if the parameter is no less than 0, this means that the setup slack is large enough, and the hold time violation may be fixed at the node. The above parameter may be calculated for all the nodes in the DAG, so as to determine the node(s) where the hold time violation fixing is not allowed (for convenience of description, hereinafter referred to as unfixable nodes), and identify the unfixable node(s) in the DAG. In the DAG example as shown in FIG. 3, it is assumed that nodes B, U, V and Z are unfixable nodes, and thus are identified by "ⓧ", for example.

Returning to FIG. 2, in step S202, the circuit is divided into a plurality of regions.

Figure 4:
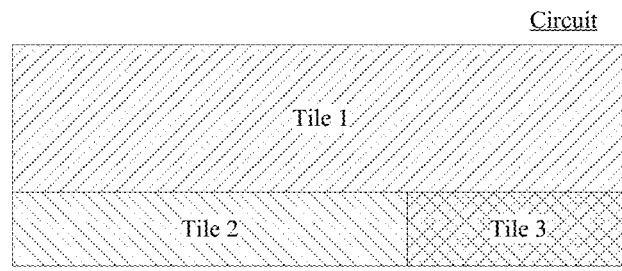
FIG. 4 shows an example of a tile map generated by dividing a circuit into three regions according to an embodiment of the present invention.

Specifically, the circuit may be divided into the plurality of regions (or tiles) in any proper manner, to generate a tile map of the circuit. FIG. 4 shows schematically an example of a tile map generated by dividing the circuit into three regions (tiles) according to the embodiment of the present invention. For simplicity, FIG. 4 does not show specific circuit elements. It is to be noted that a shape of the regions is not limited to a rectangular, and may be any shape, and a size of each of the regions can be flexibly selected as required. By dividing the circuit, a circuit region where each node in the DAG created in step S201 is located can be determined.

Then, a circuit element density of each region (tile) may be calculated. For example, a ratio of an area occupied by all circuit elements placed in each region (i.e., an area of all the circuit elements mapped onto a plane where the region is located) to a total area of the region may be calculated as the circuit element density of the region. Thereby, circuit element densities of the regions to which the respective nodes in the DAG of the circuit correspond can be determined. It is to be noted that if no element can be placed or added into a certain region (tile) due to some restrictions, the circuit element density of this region may be set to be infinite, in order to avoid insertion of a new element into the region in a subsequent fixing operation.

Returning to FIG. 2, in step S203, a hold time correction element is selectively placed in the region corresponding to the node in the DAG according to the circuit element density of the region corresponding to the node, so as to fix the hold time violation thereof. For example, the circuit element density of the region corresponding to the node may be compared with a density threshold, and the hold time correction element may be placed in the region corresponding to the node to fix the hold time violation thereof, in response to that the circuit element density of the region corresponding to the node does not exceed the density threshold.

Specifically, firstly a node list may be created, the node list includes all nodes in the DAG whose hold time violations can be fixed (for convenience of description, hereinafter referred to as fixable nodes), and the respective nodes in the node list are ranked according to numbers of input paths (i.e., numbers of different paths from starting nodes of respective branches of the DAG to the fixable nodes), numbers of output paths (i.e., numbers of different paths from the fixable nodes to last nodes of the respective branches of the DAG) and the hold slacks of the respective fixable nodes in the node list. For example, products of the number of input paths and the number of output paths of the respective fixable nodes may be calculated, respectively, and the respective fixable nodes may be ranked in a descending order of the products, where if the products of the number of input paths and the number of output paths of two or more fixable nodes are equal to each other, these nodes may be ranked in a descending order of absolute values of the hold slacks of the two or more fixable nodes (i.e., in an order from a serious hold time violation to a slight hold time violation), and if the hold slacks of two fixable nodes are equal to each other, they may be ranked in any order. In the example shown in FIG. 3, there is only one input path of node A (i.e., path from the output pin of the IP core to node A), and there are 8 output paths of node A (i.e., paths from node A to input pins of respective registers), i.e. the paths A-C-D-E-F-G, A-C-D-E-F-H, A-I-X-J-K-L, A-I-X-J-K-M, A-N-O-P-Q-K-L, A-N-O-P-Q-K-M, A-N-S-Y-T-Z-U and A-S-Y-T-Z-V, therefore the product of the number of input paths and the number of output paths of node A is 8. Similarly, the products of the number of input paths and the number of output paths of other nodes may be determined, and the respective nodes can be ranked according to the products and the hold slacks in the above-mentioned manner. In the embodiment of the present invention, the node list may further include the unfixable node(s) in the DAG, in which case the unfixable node(s) may be ranked after all the fixable nodes or may be not ranked together with the fixable nodes, and among the unfixable nodes, they may either be ranked in the above-mentioned manner or may be not ranked. In other embodiments, the node list may not include the unfixable nodes.

The created node list may take any suitable form according to actual needs. For example, the node list as shown in Table 1 below may be created in the above-mentioned manner for the DAG shown in FIG. 3, where the nodes represented by italic letters are nodes corresponding to regions whose circuit element densities exceed the density threshold:

TABLE 1

| Sequence | Nodes | |
| --- | --- | --- |
| number | Fixable | Unfixable |
| 8 | *AR* | |
| 7 | | |
| 6 | K | B |
| 5 | | |
| 4 | *OPQNWSYT* | |
| 3 | *LM* | *ZUV* |
| 2 | *CDEFIXJ* | |
| 1 | *GH* | |

In Table 1, the product of the number of input paths and the number of output paths of each node is used as a sequence number of the each node, where a node having a large sequence number will be processed first in a subsequent operation. Two or more nodes having the same sequence number may be ranked from left to right according to the absolute values of the hold slacks thereof, and an order thereof is represented by positions of the nodes, where the nodes on the left will be processed first in the subsequent operation. In addition, in Table 1, the unfixable nodes are located in a column different from that where the fixable nodes are located, to show that the unfixable nodes are ranked after the fixable nodes. It is to be appreciated that Table 1 is merely exemplary, and other forms of node list may be used. For example, a node queue A-R-K-O-P-Q-N-W-S-Y-T-L-M-C-D-E-F-I-X-J-G-H-B-Z-U-V may be simply created in the above ranking manner.

After the node list is created, hold time correction elements may be selectively placed in the regions corresponding to the respective nodes to fix the hold time violations thereof, according to the circuit element densities of the regions corresponding to the respective nodes in the order of the respective nodes in the node list.

Specifically, the circuit element density of the region corresponding to each node may be compared with the density threshold, in the order of each node in the node list. The density threshold may be a value flexibly selected according to a design need and/or other factors. When a circuit element density of a region corresponding to some node in the node list exceeds the density threshold, this means that the element density of the region corresponding to the node is too large, thus a new element should not be inserted into the region to fix the hold time violation at the node. Conversely, when a circuit element density of a region corresponding to some node in the node list does not exceed the density threshold, this means there is a relatively large free space in the region corresponding to the node, thus a new hold time correction element can be inserted into the region to fix the hold time violation at the node. The hold time correction element may be any type of element that can introduce time delay, such as a buffer or a delay element commonly known in the art. Since an amount of the time delay that can be introduced by each type of hold time correction element is known, the type and the number of the hold time correction element which is finally inserted may be determined according to the hold slack at the node and the amount of the time delay that can be introduced by each type of hold time correction element; then the hold time correction element is inserted into the region corresponding to the node, so as to fix the hold time violation at the node. The specific manner of using the hold time correction element to fix the hold time violation at the node is commonly known in the art, and a description thereof is omitted here. After the fixing operation is performed on the node, the node (i.e., the node where the hold time violation has been fixed) and all nodes in a same signal path as the node may be removed from the node list. A reason for performing the removing operation is that, when the hold time violation is fixed by inserting the hold time correction element into the region corresponding to the node, hold slacks of all the nodes in the same signal path as the node will change, so the fixing of the hold time violation should not be performed on these nodes on the basis of the original hold slacks.

The fixing operation is described below in conjunction with the example shown in FIG. 3. In the example shown in FIG. 3, in the order of the respective nodes, it is determined firstly whether a circuit element density of a region corresponding to node A exceeds the density threshold, and a positive result is obtained, therefore the hold time correction element is not be placed in the region corresponding to node A to fix the hold time violation thereof. Next, it is checked whether a circuit element density of a region corresponding to node R exceeds the density threshold, and a positive result is obtained, therefore the hold time correction element is not placed in the region corresponding to the node R to fix the hold time violation thereof. Next, since a circuit element density of a region corresponding to node K does not exceed the density threshold, the hold time correction element is inserted in the region corresponding to node K to fix the hold time violation thereof. Then, node K and nodes in the same signal path as node K, i.e., nodes A, I, X, J, L, M, N, O, P, Q, B and W, may be removed from the node list. A node list shown in Table 2 is obtained by the removing operation.

TABLE 2

| Sequence number | Nodes | |
|---|---|---|
| | Fixable | Unfixable |
| 8 | | |
| 7 | | |
| 6 | | |
| 5 | | |
| 4 | SYT | |
| 3 | | ZUV |
| 2 | CDEF | |
| 1 | GH | |

Then, the above operation may be repeated for other fixable nodes after node K in the node list shown in Table 2, until all fixable nodes in the node list have been checked. For the example shown in FIG. 3, a following node list shown in Table 3 may be obtained after the above operation is executed for all the fixable nodes in the node list.

TABLE 3

| Sequence number | Nodes | |
|---|---|---|
| | Fixable | Unfixable |
| 8 | | |
| 7 | | |
| 6 | | |
| 5 | | |
| 4 | SYT | |
| 3 | | ZUV |
| 2 | | |
| 1 | | |

It can be seen that all nodes in Table 3 are unfixable nodes, or fixable nodes corresponding to regions whose circuit element densities exceed the density threshold.

After the above operation has been completed, for each of the rest fixable nodes (which are the fixable nodes corresponding to the regions whose the circuit element densities exceed the density threshold) in the node list, a region which surrounds the region corresponding to the node and whose circuit element density does not exceed the density threshold (for convenience of description, hereinafter referred to as a replacing region) can be found, and a hold time correction element chain as described below is inserted into the replacing region, instead of the region corresponding to the node, to fix the hold time violation at the node.

Specifically, a region whose circuit element density does not exceed the density threshold may be found as the replacing region, from regions with distances from the region corresponding to the rest fixable node which are no more than a preset distance threshold. The distance threshold may be set flexibly according to an actual situation of the circuit, so that the replacing region is directly adjacent to the region corresponding to the rest fixable node or is separated from the region corresponding to the rest fixable node by one or more regions.

Then, at least one hold time correction element (e.g., delay element) can be inserted into the selected replacing region to fix the hold time violation at the node. Since there is a distance between the inserted hold time correction element and the node, at least one driving element (e.g., buffering element), besides the hold time correction element, is necessarily inserted between the node and the hold time correction element, for connecting the at least one hold time correction element with the node, and driving the at least one hold time correction element to enable it to operate. Thus, the at least one hold time correction element and the at least one driving element form the hold time correction element chain.

Figure 5A:
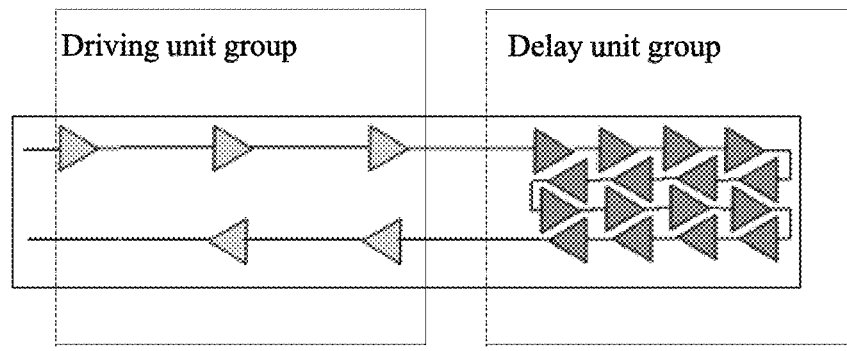
FIG. 5A and FIG. 5B schematically show two types of hold time correction element chains according to an embodiment of the present invention.
Figure 5B:
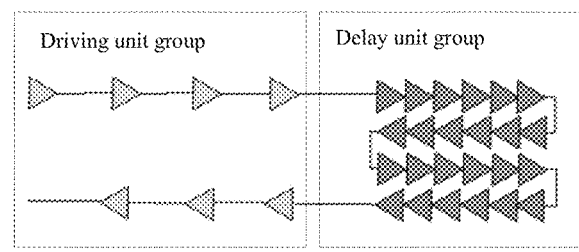

In the embodiment of the present invention, two types of hold time correction element chains may be used, i.e., a large-delay type of hold time correction element chain shown in FIG. 5A and a low-variation type of hold time correction element chain shown in FIG. 5B. As shown in FIG. 5A and FIG. 5B, the two types of hold time correction element chains include a hold time correction element group having at least one hold time correction element and a driving element group having at least one driving element. Each hold time correction element in the large-delay type of hold time correction element chain shown in FIG. 5A can introduce a large time delay, thus only a few hold time correction elements are needed to introduce a required amount of time delay, therefore a small space is occupied; however, since influence of characteristic variation of the hold time correction element caused by manufacturing processes and the like on the circuit is relatively large, it is apt to cause a new timing violation (e.g., a setup time violation). Each hold time correction element in the low-variation type of hold time correction element chain shown in FIG. 5B can introduce a small time delay, thus more hold time correction elements are needed to introduce the required amount of time delay, therefore a large space is occupied; however, since influence of the characteristic variation of the hold time correction element caused by manufacturing processes and the like on the circuit is relatively small, it is not apt to cause a new timing violation.

When a hold time correction element chain is to be inserted to fix a hold time violation of some rest fixable node, the type of the hold time correction element chain to be inserted can be selected according to a setup slack and a hold slack at the node. For example, a parameter SetupSlack+$V_2$*HoldSlack can be set, where $V_2$ is an empirical value greater than $V_1$, e.g., 5. For the fixable node, a value of the parameter may be calculated. If the parameter is larger than 0, this means that the setup slack is large enough, and a new timing violation is not easily caused even if the influence of the characteristic variation of the hold time correction element on the circuit is relatively large, therefore, the large-delay type of hold time correction element chain may be selected to reduce the occupied space. Conversely, if the parameter is smaller than 0, this means that the setup slack is not large enough, therefore, the low-variation type of hold time correction element chain can be selected to avoid the new timing violation from being caused. Then, a number of the hold time correction elements and a number of the driving elements in the hold time correction element chain can be determined according to the hold slack at the fixable node and a distance between the replacing region and the region corresponding to the fixable node, and the hold time correction element chain thus determined is inserted into the replacing region, in order to fix the hold time violation at the fixable node. Then, similarly, the fixable node where the hold time violation has been fixed and all nodes on the same signal path as the fixable node are removed from the node list, and the above operations are repeated for the rest fixable nodes in the node list, until the above operations have been performed on all the fixable nodes in the node list.

Thus, with the above method according to the embodiment of the present invention, the hold time violation in the circuit can be fixed, without insertion of a new element into a region whose circuit element density is excessively large and without causing congestion of wiring. Further, the above method does not need to move an element which has been placed in the circuit and/or an input/output pin thereof, so that a new timing violation due to moving the element/pin can be avoided.

It is to be noted that, since in the above method some nodes are removed without execution of the hold time violation fixing on them, a hold time violation may still exist in the circuit even if the above operation has been performed. In this case, a timing analysis may be performed again on the circuit, and the above method may be used again to fix the hold time violation when it is determined that the hold time violation occurs. However, as compared with the conventional method, it may be only necessary to repeat the method according to the embodiment of the present invention for less times.

The respective embodiments for implementing the method of the present invention have been described above with reference to the accompanying drawings. Those skilled in the art may understand that the above method may be implemented in software, in hardware, or in a combination thereof. Further, those skilled in the art may understand that by implementing the respective steps in the above method in software, in hardware, or in a combination thereof, an apparatus for fixing a hold time violation in a circuit based on the same inventive concept may be provided. Even if a hardware configuration of the apparatus is the same as that of a general-purpose processing apparatus, the apparatus will exhibit characteristics different from the general-purpose processing apparatus due to a function of software contained therein, so as to form the apparatus according to the embodiment of the present invention. The apparatus of the present invention comprises a plurality of units or modules, which are configured to execute corresponding steps. Those skilled in the art may understand how to write a program to implement actions of the units or modules by reading the present specification.

The apparatus for fixing a hold time violation in a circuit according to the embodiment of the present invention will be described in detail below with reference to FIG. 6. Because the apparatus and the method are based on the same inventive concept, the same or corresponding implementation details in the above method are also applicable to the apparatus corresponding to the above method, and these implementation details will not be described below because they have been described in the above in detail and completely.

Figure 6:
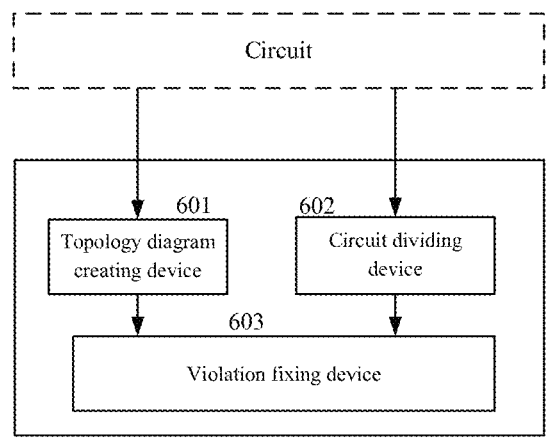
FIG. 6 is a block diagram of an apparatus for fixing a hold time violation in a circuit according to an embodiment of the present invention.

As shown in FIG. 6, the apparatus 600 for fixing a hold time violation in a circuit according to the embodiment of the present invention may comprise a topology diagram creating device 601, a circuit dividing device 602 and a violation fixing device 603.

The topology diagram creating device 601 may create a topology diagram of the circuit, a branch in the topology indicating a signal path where the hold time violation occurs in the circuit, and nodes on the branch indicating ports (e.g., input ports or output ports) of all elements (i.e., elements where hold time violations occur) on the signal path. As described above, in the embodiment of the present invention, the topology diagram may be a DAG. In other embodiments, the topology diagram may also be any other type of topology diagram. The topology diagram creating device 601 may create the topology diagram of the circuit in the above-described manner, and a description thereof will be omitted here. In other embodiments, the created topology diagram may further include a signal path where no hold time violation occurs and elements thereof, besides the signal path where the hold time violations occur and the elements thereof.

The circuit dividing device 602 may divide the circuit into a plurality of regions. Specifically, the circuit dividing device 602 may divide the circuit into the plurality of regions (or tiles) in any proper manner, thereby generating a tile map of the circuit. The regions may be in any shape, and a size of each region can be flexibly selected as required. Thus, circuit regions where respective nodes in the DAG created by the circuit dividing device 602 are located can be determined. In addition, the circuit dividing device 602 may calculate a circuit element density of each region (tile). For example, the circuit dividing device 602 may calculate a ratio of an area occupied by all circuit elements placed in each region to a total area of the region, as the circuit element density of the region. Thereby, the circuit dividing device 602 may determine the circuit element densities of the regions corresponding to the respective nodes in the DAG of the circuit. It is to be noted that, if no element can be placed or added into a certain region (tile) due to some restrictions, the circuit dividing device 602 may set the circuit element density of the region to be infinite.

The violation fixing device 603 may place a hold time correction element selectively in the region corresponding to the node in the DAG to fix the hold time violation thereof, according to the circuit element density of the region corresponding to the node in the DAG. For example, the violation fixing device 603 may compare the circuit element density of the region corresponding to the node with a density threshold, and place the hold time correction element in the region corresponding to the node to fix the hold time violation thereof, in response to that the circuit element density of the region corresponding to the node does not exceed the density threshold.

Figure 7:
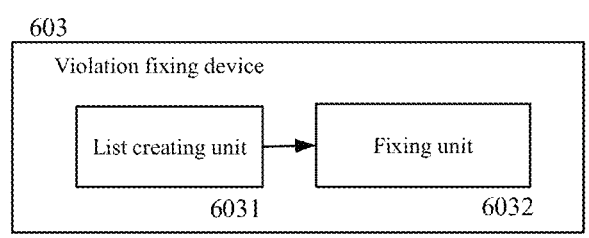
FIG. 7 schematically shows a structure of a violation fixing device shown in FIG. 6.

Hereinafter, the violation fixing device 603 will be described in detail with reference to FIG. 7. As shown in FIG. 7, the violation fixing device 603 may include a list creating unit 6031 and a fixing unit 6032.

The list creating unit 6031 may create a node list which includes all nodes where the hold time violations can be fixed (for the convenience of description, hereinafter referred to fixable nodes) in the DAG, where the respective nodes in the node list may be ranked according to numbers of input paths, numbers of output paths and hold slacks of the respective fixable nodes in the node list. The list creating unit 6031 may execute the ranking operation in the above-described manner, and a detailed description thereof is omitted here. The created node list may take any suitable form as actually required.

After the node list is created, the fixing unit 6032 may selectively place the hold time correction elements in the regions corresponding to the respective nodes to fix the hold time violations thereof, according to the circuit element densities in the regions corresponding to the respective nodes, in an order of the respective nodes in the node list. Specifically, the fixing unit 6032 may compare the circuit element density of the region corresponding to each node with the density threshold, in the order of each node in the node list. When a circuit element density of a region corresponding to some node in the node list exceeds the density threshold, the fixing unit 6032 will not insert a new element in the region to fix the hold time violation at the node. Conversely, when a circuit element density of a region corresponding to some node in the node list does not exceed the density threshold, the fixing unit 6032 may insert a hold time correction element in the region to fix the hold time violation at the node. The hold time correction element may be any type of element that can introduce time delay, such as a buffer or a delay element commonly known in the art. Since an amount of the time delay that can be introduced by each type of hold time correction element is known, the fixing unit 6032 may determine the type and the number of the hold time correction element which is finally inserted, according to the hold slack at the node and the time delay that can be introduced by each type of time delay element, then insert the hold time correction element into the region corresponding to the node, so as to fix the hold time violation at the node. A specific manner for the fixing unit 6032 to use the hold time correction element to fix the hold time violation at the node is commonly known in the art, and a description thereof is omitted here. After performing the fixing operation on the node, the fixing unit 6032 may remove the node (i.e., the node where the hold time violation has been fixed) and all nodes in the same signal path as the node from the node list.

After the above operation has been completed, for each of the rest fixable nodes (which are the fixable nodes corresponding to the regions whose circuit element densities exceed the density threshold), the fixing unit 6032 may find a region which surrounds the region corresponding to the fixable node and whose circuit element density does not exceed the density threshold (i.e. the replacing region described above), and insert a hold time correction element chain in the replacing region, instead of the region corresponding to the fixable node, to fix the hold time violation at the fixable node. As described above, the hold time correction element chain includes at least one hold time correction element placed in the replacing region and at least one driving element which connects the at least one hold time correction element with the fixable node. Specifically, the fixing unit 6032 may select the type of the hold time correction element to be inserted according to a setup slack and a hold slack at the node. For example, the fixing unit 6032 may select the large-delay type of hold time correction element chain described above to reduce an occupied space when a parameter SetupSlack+$V_2$*HoldSlack is greater than 0, and select the low-variation type of hold time correction element chain to avoid causing a new timing violation when the parameter is smaller than 0. Then, the fixing unit 6032 may determine a number of the hold time correction elements and a number of the driving elements in the hold time correction element chain, and insert the hold time correction element chain thus determined into the replacing region. Then, the fixing unit 6032 may remove the fixable node where the hold time violation has been fixed and all nodes on the same signal path as the fixable node from the node list, and repeat the above operations for the rest fixable nodes in the node list, until the above operations has been performed on all the fixable nodes in the node list.

Thus, with the above apparatus according to the embodiment of the present invention, the hold time violation in the circuit can be fixed, and meanwhile insertion of more elements into a region whose circuit element density is excessively large and congestion of wiring can be avoided. Further, the above apparatus does not need to move an element which has been placed in the circuit and an input/output pin thereof, so that a new timing violation due to moving the element/pin can be avoided.

After the hold time violation fixing operation has been performed once by the above apparatus, a timing analysis may be performed again on the circuit as described above, and the above apparatus may be used again to fix a hold time violation when it is determined that the hold time violation occurs, until no hold time violation occurs in the circuit.

It is to be noted that the above method and apparatus according to the embodiments of the present invention are only illustrative, not limitative. Those skilled in the art may make appropriate modifications and amendments thereto without departing from the scope of the present invention. For example, although step S201 is executed first and then step S202 is executed in the above, this is not limitative, and it is also possible to execute step S202 first and then execute step S201.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for fixing a hold time violation in a circuit, comprising:
   identifying the hold time violation in the circuit;
   creating a topology diagram of the circuit, a branch in the topology diagram indicating a signal path where the identified hold time violation occurs in the circuit, and a node on the branch indicating a port of an element where the identified hold time violation occurs in the signal path;
   dividing the circuit into a plurality of regions; and
   placing a hold time correction element selectively in an identified region corresponding to the node in the topology diagram to fix the hold time violation of the node, according to a circuit element density of the identified region,
   wherein the placing comprises:
      creating a node list which includes all nodes in the topology diagram having fixable hold time violations, the respective nodes in the node list being ranked according to numbers of input paths and output paths and hold slacks of the respective nodes in the node list;
      for each node in the node list, identifying in the topology diagram, from the plurality of regions, a region corresponding to the node; and
      placing hold time correction elements selectively in the identified regions corresponding to the nodes in the node list, to fix the hold time violations thereof, according to circuit element densities of the identified regions corresponding to the respective nodes in the node list, in an order of the respective nodes in the node list.

2. The method of claim 1, wherein the placing a hold time correction element selectively in an identified region corresponding to the node in the topology diagram to fix the hold time violation of the node, according to a circuit element density of the identified region includes:
   comparing the circuit element density of the identified region corresponding to the node with a density threshold; and
   placing the hold time correction element in the identified region corresponding to the node to fix the hold time violation thereof, in response to determining that the circuit element density of the region corresponding to the node does not exceed the density threshold.

3. The method of claim 1, wherein the placing a hold time correction element selectively in an identified region corresponding to the node in the topology diagram to fix the hold time violation of the node, according to a circuit element density of the identified region further includes:

removing, from the node list, the node where the hold time violation has been fixed and nodes on a same signal path as the node.

4. The method of claim 3, wherein the placing a hold time correction element selectively in an identified region corresponding to the node in the topology diagram to fix the hold time violation according to a circuit element density of the identified region further includes:

selecting, for a rest node where hold time violation can be fixed in the node list, a region which surrounds a region corresponding to the rest node and whose circuit element density do not exceed the density threshold;

placing a hold time correction element chain in the selected region to fix the hold time violation at the rest node, the hold time correction element chain including at least one hold time correction element placed in the selected region and at least one driving element connecting the at least one hold time correction element with the rest node.

5. The method of claim 4, wherein the placing a hold time correction element chain in the selected region to fix the hold time violation at the rest node includes:

selecting a type of the hold time correction element chain according to a setup slack and a hold slack at the rest node, and placing the selected type of hold time correction element chain in the selected region to fix the hold time violation at the rest nodes.

6. An apparatus for fixing a hold time violation in a circuit, comprising:

a hold time violation identification device, configured to identify the hold time violation in the circuit;

a topology diagram creating device, configured to create a topology diagram of the circuit, a branch in the topology diagram indicating a signal path where the hold time violation identified by the hold time violation identification device occurs in the circuit, and a node on the branch indicating a port of an element where the hold time violation identified by the hold time violation identification device occurs in the signal path;

a circuit dividing device, configured to divide the circuit into a plurality of regions;

a violation fixing device, configured to place a hold time correction element selectively in an identified region corresponding to the node in the topology diagram to fix the hold time violation of the node, according to a circuit element density of the identified region, wherein the violation fixing device includes:

a list creating unit configured to create a node list which includes all nodes in the topology diagram having fixable hold time violations, the respective nodes in the node list being ranked according to numbers of input paths and output paths and hold slacks of the respective nodes in the node list;

an identifying unit configured to for each node in the node list created by the list creating unit, identify in the topology diagram, from the plurality of regions, a region corresponding to the node; and a fixing unit configured to selectively place hold time correction elements in the identified regions corresponding to the nodes in the node list, to fix the hold time violations thereof, according to circuit element densities of the identified regions corresponding to the respective nodes in the node list, in an order of the respective nodes in the node list.

7. The apparatus of claim 6, wherein the violation fixing device is configured to compare the circuit element density of the identified region with a density threshold, and place the hold time correction element in the identified region fix the hold time violation of the node, in response to determining that the circuit element density of the identified region does not exceed the density threshold.

8. The apparatus of claim 7, wherein the fixing unit is further configured to remove, from the node list, the node where the hold time violation has been fixed and nodes on a same signal path as the node.

9. The apparatus of claim 8, wherein the fixing unit is further configured to select, for a rest node where hold time violation can be fixed in the node list, a region which surrounds a region corresponding to the rest node and whose circuit element density do not exceed the density threshold, and place a hold time correction element chain in the selected region to fix the hold time violation at the rest node, the hold time correction element chain including at least one hold time correction element placed in the selected region and at least one driving element connecting the at least one hold time correction element with the rest node.

10. The apparatus of claim 9, wherein the fixing unit is configured to place a hold time correction element chain in the selected region to fix the hold time violation at the rest node by selecting a type of the hold time correction element chain according to a setup slack and a hold slack at the rest node, and placing the selected type of hold time correction element chain in the selected region to fix the hold time violation at the rest nodes.

* * * * *